United States Patent [19]
Lehmann et al.

[11] 3,912,899
[45] Oct. 14, 1975

[54] STRAIGHTENING DEVICE FOR WIRE ELECTRODE USED IN AN ELECTRO-EROSION MACHINING APPARATUS

[75] Inventors: Hans Lehmann; Roger Girardin; William Morf; Roger Delpretti, all of Geneva, Switzerland

[73] Assignee: Ateliers des Charmilles, S.A., Geneva, Switzerland

[22] Filed: Aug. 19, 1974

[21] Appl. No.: 498,654

[30] Foreign Application Priority Data
Aug. 24, 1973  Switzerland.................... 12181/73

[52] U.S. Cl............................. 219/69 V; 219/69 V
[51] Int. Cl.² ........................................ B23P 1/08
[58] Field of Search ... 219/69 V, 69 E, 69 R, 69 M, 219/10.61, 10.57, 10.69, 131 F

[56] References Cited
UNITED STATES PATENTS
3,010,012  11/1961  Tuthill ............................ 219/131 F
3,182,167  5/1965  McBrien ......................... 219/10.61
3,822,374  7/1974  Ullmann et al. .................. 219/69 V
3,830,996  8/1974  Ullmann et al. .................. 219/69 V FOREIGN PATENTS OR APPLICATIONS
776,172  6/1957  United Kingdom............... 219/69 V

*Primary Examiner*—Bruce A. Reynolds
*Attorney, Agent, or Firm*—Hauke, Patalidis & Dumont

[57] ABSTRACT

A device for straightening a wire electrode fed through the machining zone between the electrode and a workpiece in an electro-erosion machining apparatus, comprising a heating and straightening zone having means for heating the wire while simultaneously placing it under traction. The wire is passed through the heating and straightening zone prior to passing through the machining zone, and means are provided for maintaining the wire under a greater traction while simultaneously maintaining its temperature at a lower temperature while passing through the machining zone.

6 Claims, 3 Drawing Figures

STRAIGHTENING DEVICE FOR WIRE ELECTRODE USED IN AN ELECTRO-EROSION MACHINING APPARATUS

BACKGROUND OF THE INVENTION

The present invention relates to the field of apparatus for machining a workpiece by electro-erosion by means of an electrode tool in the form of a wire fed through the machining zone between the electrode tool and the workpiece, and permits to effectuate machining of the workpiece with a high precision. In an apparatus of this type, the wire electrode is fed through the machining zone at a predetermined longitudinal velocity, such as to compensate for the wear of the electrode while being transversely fed relative to the workpiece. The relative displacement of the wire electrode and workpiece is generally effected automatically by means of a servo system under the control of programmed instructions defining a predetermined machining path.

In order to achieve a machined surface on the workpiece which accurately conforms to the programmed instructions it is necessary that the wire electrode be supported and guided as straight as possible while being longitudinally fed through the machining zone. It is rather difficult to maintain the wire electrode straight as bending the wire out of shape is unavoidable in view of the diverse changes of direction that the wire must take while being unwound from a reel or drum and directed to an appropriate positioning in the machining zone. The best results are achieved when the wire is straightened prior to feeding into the machining zone and the wire is not caused to change its direction of travel while being fed through the machining zone.

It is known to heat a wire electrode to a predetermined temperature in order to straighten the wire, while simultaneously exerting on the wire a relatively weak predetermined traction. It is known to utilize such a method for statically straightening a wire electrode used for drilling very small diameter holes in a workpiece. However, unless a particular arrangement of parts is adopted, such a technique is not applicable to straightening a wire electrode which is longitudinally fed at a predetermined velocity into a machining zone. This is due to the fact that the traction which need be exerted upon the wire and the temperature of the wire while passing through the machining zone are different basically from those which are required for straightening the wire.

The present invention presents the advantage of adapting the known principle of straightening a wire by heating to an electro-erosion machining technique utilizing a continuously fed wire electrode. Another advantage of the present invention is to provide, in addition to straightening the wire under optimum conditions, means for calibrating the wire to an appropriate size prior to feeding the wire into the machining zone.

SUMMARY OF THE PRESENT INVENTION

The present invention therefore has for its principal object to provide means for presenting a perfectly straight electrode wire to the machining zone of an electro-erosion machine utilizing a wire electrode continuously fed through the machining zone by first subjecting the wire to a traction while being heated at a predetermined temperature and subsequently increasing the traction on the wire and decreasing its temperature prior to feeding the wire through the machining zone.

BRIEF DESCRIPTION OF THE DRAWINGS

The present invention will be best understood when the following description of some of the best modes contemplated for practicing the invention is read in conjunction with the attached drawing wherein.

DETAILED DESCRIPTION OF THE PREFERRED EMBODIMENTS

Figures 1, 2:
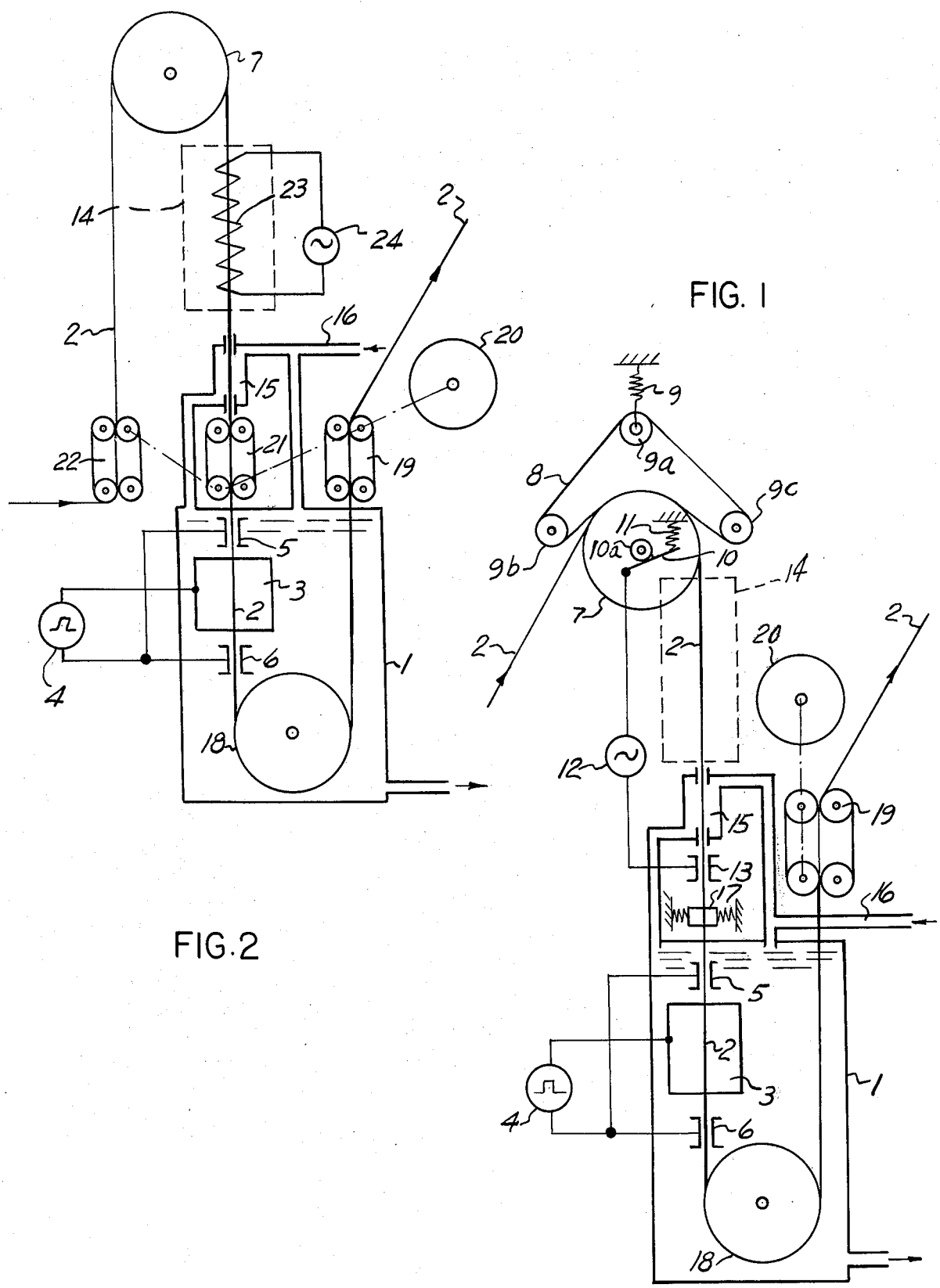
FIG. 1 illustrates schematically an arrangement for straightening a wire electrode wherein the traction exerted on the wire is provided by mechanical braking means.
FIG. 2 schematically represents a modification of the arrangement of FIG. 1 wherein the traction exerted on the wire is provided as a result of applying unequal feed forces on the wire at various portions of its travel.

Referring now to FIG. 1, an electro-erosion machining apparatus is represented as comprising a tank 1 filled with an appropriate machining fluid. A wire electrode 2, made of an electrically conductive material, is longitudinally fed into the reservoir for making a cut on a workpiece 3. The cut on the workpiece 3 is effected by electrical discharges occurring in the machining zone between the wire electrode 2 and the workpiece 3, which are supplied by a generator 4 connected across the workpiece 3 and the wire electrode 2. The connection of the generator 4 to the wire electrode 2 is effected through a pair of contacts, schematically represented at 5 and 6, which also act as guides for the wire electrode 2. The wire electrode 2 is supplied from a reel, not shown, to a feed pulley 7, being maintained in engagement with the periphery of the pulley 7 by means of a continuous belt 8 wound around drums 9a, 9b and 9c and resiliently maintained in engagement with a portion of the periphery of the pulley 7 by a spring 9 pulling on the drum 9a.

The pulley 7 is continuously and adjustably braked by a brake shoe 10 urged in frictional engagement by a spring 11 with a brake drum 10a rotating in unison with the pulley 7. The brake shoe 10 forms an electrical contact for the pulley 7 and the wire 2 and is connected to a terminal of an electrical generator 12, the other terminal of which is connected to a brush contact 13 engaged with the wire 2, such that the portion of the wire 2 between the pulley 7 and the brush contact 13 is resistively heated by the electrical current supplied by the generator 12 and flowing through that portion of the wire.

The wire 2, consequently, during its travel between the pulley 7 and the brush contact 13 is subjected to resistive heating in a heating zone 14 which may be simply the ambiant atmosphere or, alternatively, which may consist of a chamber provided with appropriate heat reflective walls to facilitate the temperature rise of the wire while passing through the heating zone. After passage through the heating zone 14 the wire is fed across a chamber 15 through which flows the machining fluid normally filling the tank 1 which is supplied under pressure to the chamber 15 by a pump, not shown, by way of supply pipe 16.

Prior to being finally fed into the tank 1, the wire 2 passes through a mechanical brake 17. The wire 2 is threaded at the bottom of the tank 1 around a pulley 18, and is pulled by a feeding means 19 driven by an electric motor 20.

It will be appreciated that between the pulley 7 and the brush contact 13 the wire 2 is passed successively through the heating zone 14, where it is straightened by being heated and simultaneously subjected to a longitudinal traction, and through the chamber 15 which forms a cooling zone linearly aligned with the straightening zone 14. In this manner, the wire 2 is fed from a zone to the next one without being subjected to mechanical stress in a transverse direction relative to its longitudinal axis, which permits to achieve an almost perfect straightening of the wire. In the heating and straightening zone, the longitudinal traction applied to the wire is a function of the braking effect of the pulley 7. Because of the presence of the mechanical brake 17, the longitudinal traction exerted on the wire during its passage through the tank 1 is higher than the traction exerted upon the wire during its straightening through the heating zone 14, which results in a favorable influence for maintaining the straightness of the wire in the machining zone.

The embodiment illustrated at FIG. 2 is substantially similar to the embodiment of FIG. 1, except with respect to some modifications of detail. The elements and parts which are common to both embodiments are identified by like reference numerals and the description of the common elements and parts will not be repeated for the sake of brevity.

In the modification of FIG. 2, the traction exerted on the wire 2 is controlled by the means feeding the wire, and not by mechanical braking means as in FIG. 1. The feeding means for the wire consist of three individual means each comprising two pairs of pulleys. One such pair of pulleys, designated by numeral 19, is disposed for driving the wire being fed from the tank 1 and corresponds to the feeding means 19 of FIG. 1. The feeding means 19, driven by the motor 20, is mechanically coupled to similar feeding means 21 and 22 providing each a feeding speed to the wire which is different from the other. The feeding means 21 provide a feeding speed which is very slightly less than the feeding speed of the driving means 19, such that a longitudinal traction is exerted on the wire 2 while being passed through the machining zone which is adequate to insure that the wire is held rigidly in the machining zone. The feeding speed of the wire feeding means 22 is slightly lower than that of the wire feeding means 21, the difference between the relative speed of the wire feeding means being dependent on how much elongation of the wire 2 is required to straighten the wire. As in the previous embodiment, the wire 2 is first passed through a zone 14 where it is heated for example by induction by means of an induction coil 23 across a high frequency generator 24. After passage through the heating zone 14, the wire 2 is led into a chamber 15 wherein it is cooled by a flow of fresh machining fluid.

Figure 3:
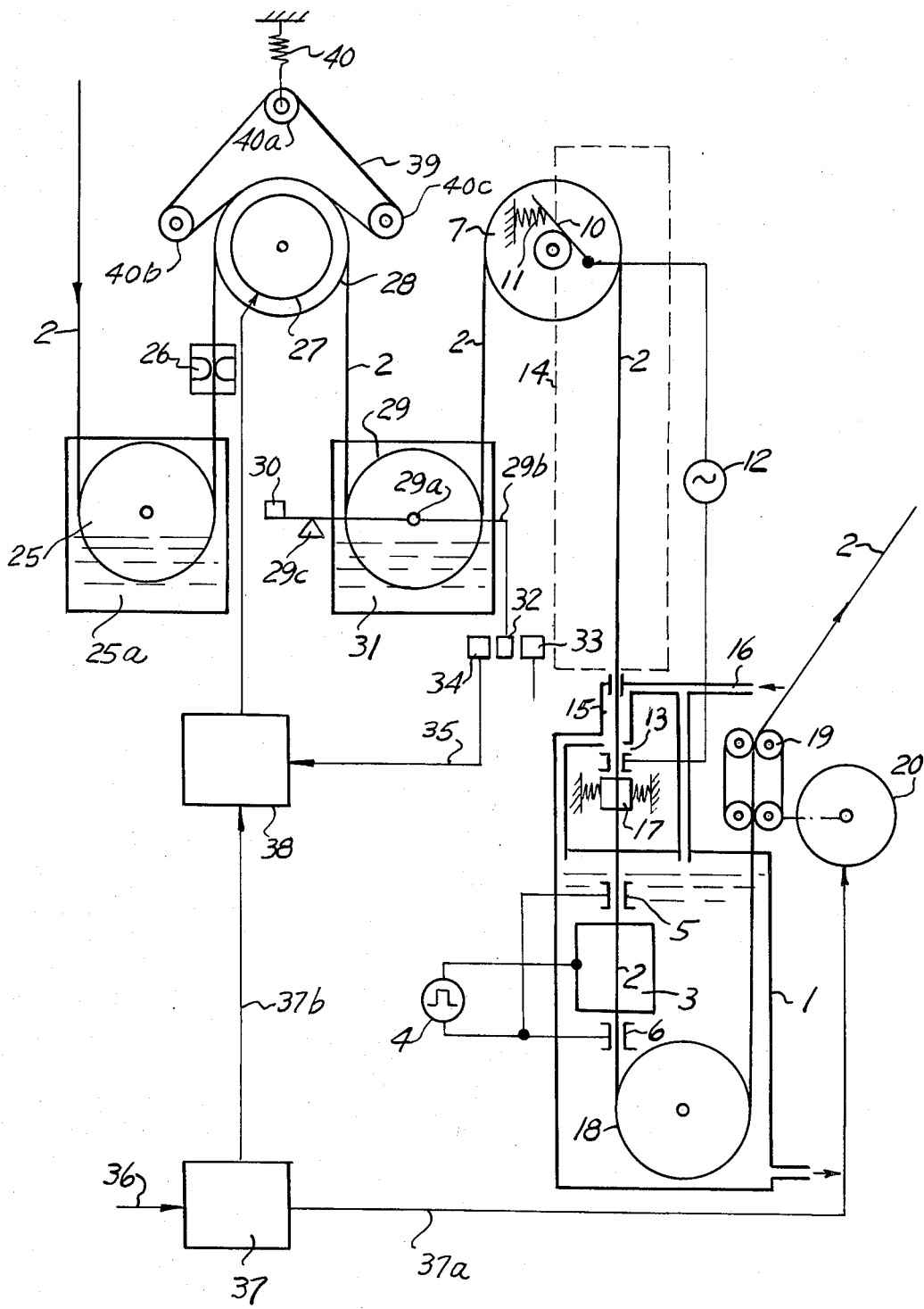
FIG. 3 schematically illustrates a further modification wherein the traction applied to the wire is controllably dependent upon the action of an auxilliary motor.

The embodiment of FIG. 3 is substantially like that illustrated at FIG. 1, but comprises means for sizing the wire to an appropriate diameter before being wound about the pulley 7. The wire 2, being fed from a reel, not shown, is thus caused by a pulley 25 to first dip through a tank 25a filled with a lubricating fluid. The wire 2 is then caused to be fed through a sizing means in the form of a drawing die through which it is pulled by a drum 28 driven by a motor 27, the wire being held in engagement with the periphery of the drum 28 by an endless belt 39 supported by drums 40a, 40b and 40c, the belt being held in tension by a spring 40 pulling on the drum 40a.

In order to apply to the wire 2 the predetermined and relatively slight axial traction which is required for straightening the wire while passing through the heating zone 14, the speed of the motor 27 is controlled as a function of the position of the center of rotation of a pulley 29. To that effect, the spindle 29a of the pulley 29 is mounted on a bifurcated support member 29b adapted to pivot about a pivot point 29c. The weights of the pulley 29 and of its support member 29b are partially balanced by means of a counterwight 30, and the pulley 29 causes the wire 2 to dip into a tank 31 containing a cleaning fluid. A mask 32 is mounted on the end of the pulley support member 29b so as to project between a light source 33 and a photocell 34, such that the photocell 34 provides at its output on the line 35 an electrical signal proportional to the vertical position of the pulley 29.

The speed of rotation of each of the motors 20 and 27 is determined as a function of a signal on a line 36 to the input of a power supply 37 which is connected to the motor 20 directly as shown by line 37a, and to the motor 27 through an amplifier 38. The signal controlling the motor 27 is thus amplified by the amplifier 38 whose gain is variable and adjusted by the signal from the line 35. In other words, the gain of the amplifier 38 is a function of the vertical position of the pulley 29. If the length of the loop of wire 2 between the pulleys 28 and 7 is too short, the speed of the motor 27 is increased until a normal loop length is obtained.

In the event that induction heat, as described relative to FIG. 2, is used to heat the wire 2 in the heating zone 14, the pull exerted on the wire during its straigtening may result simply from the load applied upon the wire by the pulley 29. This load may be adjusted by using weights of appropriate values disposed on the pulley support member 29b or by sliding weights along the length of the support member frame, such as to preload the wire 2 by means of the resultant weight of the pulley 29 as a function of the composition of the wire and of its diameter.

Having thus described the invention by way of specific embodiments thereof, given for illustrative purposes only, modification whereof will be apparent to those skilled in the art,

What is claimed as new is:

1. An apparatus for electro-eroding a workpiece by means of a wire electrode continuously fed at a predetermined velocity to the machining zone between a workpiece and said wire electrode, said apparatus comprising means for straightening said wire electrode by passing said wire through a heating zone in which said wire electrode is heated prior to feeding said wire electrode to the machining zone, means for subjecting said wire electrode during passage through said heating zone to a predetermined traction, means for cooling said wire electrode prior to feeding it through said machining zone, and means for increasing the traction exerted on said wire electrode while passing through said machining zone.

2. The apparatus of claim 1 wherein said wire is maintained in a substantially straight line while being fed from said heating zone to said machining zone.

3. The apparatus of claim 2 wherein means for longitudinally feeding said wire electrode are disposed beyond said machining zone, and further comprising first mechanical braking means disposed ahead of said heating zone and second mechanical braking means disposed ahead of said machining zone, wherein that the traction exerted on the wire electrode between said first and second braking means is less than the traction exerted on the wire electrode in said machining zone.

4. The apparatus of claim 2 wherein first feeding means are provided for said wire electrode beyond said machining zone, second feeding means are provided between said heating zone and said machining zone, and third feeding means are provided prior to said heating zone, said first, second and third feeding means being driven by a common motor, and means for driving said feeding means from said common motor arranged such that more traction is exerted on said wire electrode between said first and second feeding means than is exerted between said second and third feeding means.

5. The apparatus of claim 2 further comprising means for sizing said wire electrode disposed in advance of said heating zone.

6. The apparatus of claim 5 wherein said sizing means comprises a drawing die, means for feeding said wire electrode disposed beyond said drawing die, and means for adjusting the speed of feeding of said wire by said means as a function of the length of a wire loop formed ahead of said heating zone.

* * * * *